No. 892,695. PATENTED JULY 7, 1908.
T. TONLINSON.
SLED BRAKE.
APPLICATION FILED JAN. 6, 1908.
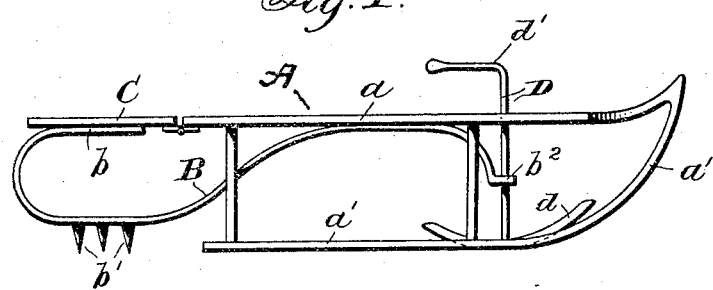
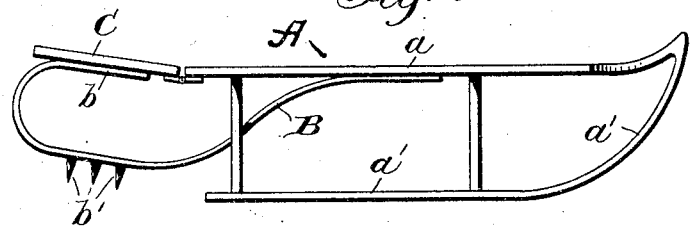
Witnesses:
Jas E Hutchinson
Thos. R. S. Heath.
Inventor:
Thomas Tonlinson
By Jas H Hunter Attorney.

UNITED STATES PATENT OFFICE.

THOMAS TONLINSON, OF CHARLEROI, PENNSYLVANIA.

SLED-BRAKE.

No. 892,695.  Specification of Letters Patent.  Patented July 7, 1908.

Application filed January 6, 1908. Serial No. 409,527.

*To all whom it may concern:*

Be it known that I, THOMAS TONLINSON, a citizen of the United States, residing at Charleroi, in the county of Washington and State of Pennsylvania, have invented certain new and useful Improvements in Sled-Brakes, of which the following is a specification, reference being had therein to the accompanying drawing.

This invention relates to an improvement in sled brakes and the object of the invention is the provision of a brake of this character which may be readily and easily manipulated by the occupant of the sled to check or wholly stop the movement of the sled at any desired point.

A further object of the invention is the provision, in combination with a brake of the above referred to type, of means for controlling the direction of movement of the sled.

Other objects of the invention will be apparent from the detailed description hereinafter when read in connection with the accompanying drawings forming a part hereof, wherein a preferable embodiment of my invention is shown and wherein like numerals of reference refer to similar parts in the several views.

In the drawings, Figure 1 is a side elevation of a sled equipped with my improved brake and guide. Fig. 2 is a similar view of a sled equipped with a brake only.

Referring now more particularly to the drawings A designates a sled, which may be of any desired type and which is provided with the usual top or body $a$ and runners $a'$.

B designates a spring arm, which is formed of metal or other suitable material and which is rigidly secured in any suitable manner to the under side of the top $a$ of the sled. The rear end of the spring arm B projects for some distance beyond the rear end of the sled A and is there provided with a return bend therein, so that the free end $b$ thereof will be positioned slightly above the plane of the top $a$ of the sled. The lower most portion of the spring arm B normally occupies a position slightly above the plane of the runners $a'$ and is provided with a braking surface $b'$, which is adapted to contact with the ground and check or stop the movement of the sled, when the spring arm is depressed, in the manner to be hereinafter more particularly set forth. The braking surface $b'$ preferably consists of a plurality of spurs or projections which may be formed integral with the spring arm B or secured thereto in any suitable manner. Pivotally secured to the rear end of the top $a$ of the sled A so as to form a continuation thereof is a platform C, which normally rests upon and is supported by the end $b$ of the spring arm B. From this construction, it will be apparent that when pressure is exerted by the operator upon the platform C, the rear end of the spring arm B will be depressed and the braking surface $b'$ thereof caused to engage the ground, so as to check or retard the movement of the sled. It will also be obvious that inasmuch as the platform C, which constitutes the means for manipulating the brake, forms a substantial continuation of the top or body $a$ of the sled, the operator may readily exert any degree of pressure upon said platform to retard or check the movement of the sled to any desired extent or may by shifting his entire weight to the platform wholly stop the sled in a very short distance.

In the preferred form of my invention, the forward end of the arm B is bent downwardly beyond its point of attachment to the under side of the top or body $a$ of the sled to form a bracket $b^2$ in which is rotatably mounted a shaft or standard D, to the lower end of which is secured a guiding runner $d$ which is adapted to run along the ground. The upper end of the shaft or standard D extends above the top of the sled and is provided with a suitable operating handle $d'$. From this construction it will be obvious that the occupant may by manipulating the handle $d'$ control the direction of movement of the sled.

While I have described the bracket $b^2$ as being formed integral with the arm B, as a preferred construction, it will be obvious that said bracket may be formed separate from said arm and secured in any suitable manner to the body of the sled.

If desired, the guide may be dispensed with and the brake only utilized, as is shown in Fig. 2.

While I have described the invention with particular reference to its use upon sleds, it will be understood that it is equally applicable to wheeled vehicles.

I do not desire to limit myself to the precise form and construction shown in the drawings, as it is obvious that many minor changes may be made thereto without departing from the spirit of the invention as defined in the appended claims.

I claim:

1. In a sled or like vehicle, the combination with the sled body and runners, of a braking member normally positioned above the plane of the runners, and means for actuating the said braking member including a platform hinged to the rear end of the sled body and forming a substantial continuation of the top thereof.

2. In a sled or like vehicle, the combination with the sled body and runners, of a yieldable braking member positioned normally above the plane of the runners, and a platform carried by said braking member and positioned adjacent the rear end of the top of the sled body.

3. In a sled or like vehicle, the combination with the sled body and runners, of a spring arm secured to the sled body and provided adjacent the free end thereof with a braking surface, a platform hinged to the sled body and forming a substantial continuation thereof, and a connection between said platform and said spring arm.

4. In a sled or like vehicle, the combination with the sled body and runners, of a spring arm secured to the sled body and extending in rear thereof, the rear end of said spring arm being provided with a braking surface and with an upwardly bent portion, and a platform hinged to the sled body and resting upon the upwardly bent portion of said spring arm.

5. In a sled or like vehicle, the combination with the sled body and runners, of a yieldable braking member positioned normally above the plane of the runners, a platform supported by said braking member and positioned adjacent the rear end of the top of the sled body, and a guide runner rotatably mounted in forward end of said sled body.

6. In a sled or like vehicle, the combination with the sled body and runners, of a yieldable braking member carried by the sled body and positioned normally above the plane of the runners, a platform supported by said braking member and position adjacent the rear end of the top of the sled body, a bracket secured to the under side of the sled body at the forward end thereof, and a vertical shaft journaled in said bracket and provided at its upper end with an operating handle and at its lower end with a guide runner.

7. In a sled or like vehicle, the combination with the sled body and runners, of a spring arm secured to the under side of the sled body, the rear end of said spring arm being provided with a braking surface normally positioned above the sled runners and the forward end of said arm being bent downwardly beyond its point of attachment with said body to form a supporting bracket, a guide runner journaled in said supporting bracket, and means for depressing the rear end of said spring arm.

8. In a sled or like vehicle, the combination with the sled body and runners, of a spring arm secured to the under side of the sled body, the rear end of said spring arm being provided with a braking surface and with an upwardly extending portion and the forward end of said arm being bent downwardly beyond its point of attachment with the sled body to form a supporting bracket, a platform hinged to the sled body and resting upon the upwardly extending portion of said spring arm, and a guide runner journaled in said supporting bracket.

9. In a sled or like vehicle, the combination with the sled body and runners, of a spring arm secured to the said body and extending rearwardly thereof, said arm being provided with a braking surface and with an integral upwardly bent portion extending into proximity to the top of the sled body and permitting its operation.

In testimony whereof I affix my signature in presence of two witnesses.

THOMAS TONLINSON.

Witnesses:
E. E. RICE,
GEORGE W. RISBECK.